(12) United States Patent
Radhakrishnan et al.

(10) Patent No.: US 11,829,261 B2
(45) Date of Patent: Nov. 28, 2023

(54) PROVIDING A LOGICAL DATA ISOLATION WITH INTERMITTENT CONNECTIVITY

(71) Applicant: Cohesity, Inc., San Jose, CA (US)

(72) Inventors: Karthick Radhakrishnan, Bangalore (IN); Saurabh Singh, Bangalore (IN)

(73) Assignee: Cohesity, Inc., San Jose, CA (US)

( * ) Notice: Subject to any disclaimer, the term of this patent is extended or adjusted under 35 U.S.C. 154(b) by 71 days.

(21) Appl. No.: 17/538,075

(22) Filed: Nov. 30, 2021

(65) Prior Publication Data

US 2023/0168973 A1 Jun. 1, 2023

(51) Int. Cl.
*G06F 11/14* (2006.01)

(52) U.S. Cl.
CPC ...... *G06F 11/1469* (2013.01); *G06F 11/1451* (2013.01); *G06F 11/1464* (2013.01)

(58) Field of Classification Search
CPC ...... H04L 45/745; H04L 45/22; H04L 61/103
USPC ........................................................ 709/227
See application file for complete search history.

(56) References Cited

U.S. PATENT DOCUMENTS

| | | | | |
|---|---|---|---|---|
| 8,392,542 B2 * | 3/2013 | Fiducci | ................... | G06F 21/60 |
| | | | | 709/227 |
| 2017/0078922 A1 * | 3/2017 | Raleigh | ................... | H04L 69/18 |
| 2018/0101678 A1 | 4/2018 | Rosa | | |
| 2022/0012134 A1 | 1/2022 | Chatterjee | | |

OTHER PUBLICATIONS

Didier Van Hoye, Air-Gapped Backups with Object Storage Immutability, Veeam, Jan. 16, 2020.
Sohail et al., Redesign Backup Strategies for Next-Gen Data Centers, 2019 Dell Technologies Proven Professional Knowledge Sharing, 2019.
Thomas et al., Improving Backup System Evaluations in Information Security Risk Assessments to Combat Ransomware, Computer and Information Science, 2018, pp. 14-25, vol. 11, No. 1, Canadian Center of Science and Education.

* cited by examiner

*Primary Examiner* — Sibte H Bukhari
(74) *Attorney, Agent, or Firm* — Shumaker & Sieffert, P.A.

(57) ABSTRACT

An intermittent network connection between a source system and a destination system is established by establishing a first connection from a management resource to a first port of the destination system, causing a second port of the destination system to be enabled including by providing an instruction via the first connection to the first port of the destination system, establishing a second connection from the management resource to a first port of a source system, causing a second port of the source system to be enabled including by providing an instruction via the second connection to the first port of the source system, registering the destination system with the source system, and causing a third connection to be established between the second port of the source system and the second port of the destination system for transferring data from the source system to the destination system. In response to a determination that a communication session of the third connection has been completed, the intermittent network connection between the source system and the destination system is terminated.

20 Claims, 5 Drawing Sheets

PROVIDING A LOGICAL DATA ISOLATION WITH INTERMITTENT CONNECTIVITY

BACKGROUND OF THE INVENTION

A traditional air gap is a network security measure that isolates a computing device from a source system and other remote devices. Backups of the source system may be performed using tape storage. Tape cartridges corresponding to the backups of the source system were transported from the source system location to the computing device location. When the source system needed to be restored to a particular point in time, the tape cartridge corresponding to the particular point in time needed to be determined, located, and transported from the computing device location to the source system location. The air gap assists in securing a copy of source system data, but provides poor recovery point objectives (RPO) and recovery time objectives (RTO).

BRIEF DESCRIPTION OF THE DRAWINGS

Various embodiments of the invention are disclosed in the following detailed description and the accompanying drawings.

DETAILED DESCRIPTION

Figure 1:
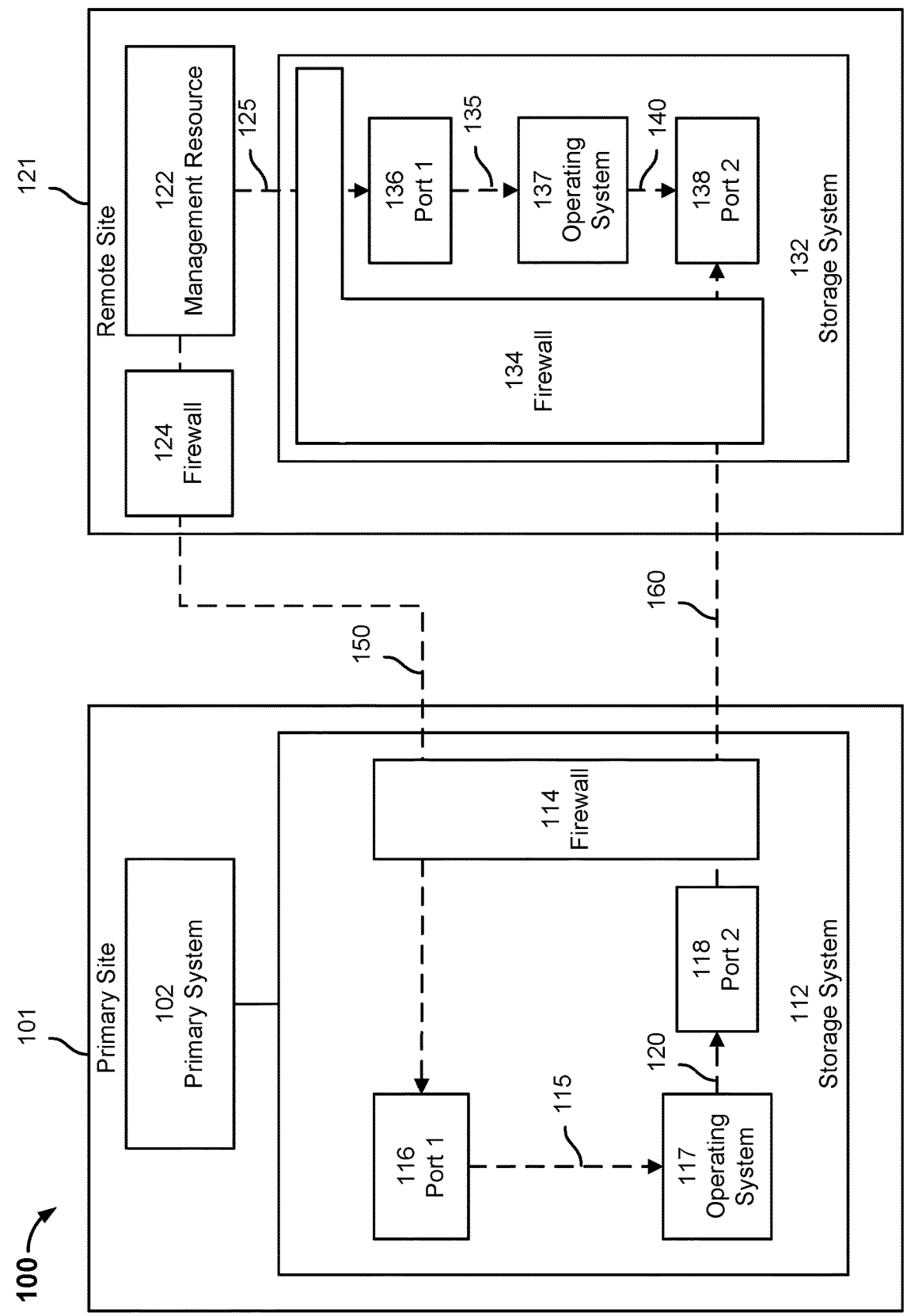
FIG. 1 is a block diagram illustrating an embodiment of a system for providing a logical data isolation with intermittent connectivity.

A technique to provide a logical data isolation with intermittent connectivity is disclosed herein. Data stored in a primary site may be protected by creating three copies of data, keeping data on at least two types of storage media, and storing one of the backups at a remote site (e.g., secure storage, cloud, etc.). The first copy of data is stored on a primary system and the other two copies of data are backups of the primary system. The primary site may include a primary system that is connected to a primary site storage system. A copy of the data may be directly provided from the primary system to a remote site storage system or indirectly provided from the primary system to the remote site storage system via the primary site storage system. The primary system and/or the primary site storage system may be connected to the remote site storage system at the remote site. These connections may be persistent connections. As a result, all three copies of data may be subject to being compromised by a malicious actor.

For example, the malicious actor may obtain credentials for the primary system. The malicious actor may utilize the credentials to access the storage system at the primary site and/or the storage system at the remote site to take advantage of the persistent connections associated with the primary system, the primary site storage system, and the remote site storage system. The malicious actor may read, write, and/or delete the data stored at storage systems.

The malicious actor may also subject the data stored at the storage systems to ransomware. After subjecting the data stored at the storage systems to ransomware, the malicious actor may delete or encrypt data stored at the primary system. As a result, the primary system may be unable to be recovered to a particular point in time corresponding to a backup unless an entity associated with the primary system (e.g., a user, a company, an organization, an enterprise, a government, an institution, etc.) complies with the malicious actor's demands.

The disclosed technique provides a logical data isolation with intermittent connectivity between the primary site and the remote site to prevent a malicious actor from accessing the copy of data stored at the remote site. A logical data isolation with intermittent connectivity may be referred to as a "modern air gap." Although the technique is described with respect to replication, the technique disclosed herein may be applicable whenever a data management operation (e.g., restore, migration, replication, archive, etc.) is performed for a cohort of data that is provided from a first system to a second system. The primary site and the remote site are network isolated from each other except for a particular amount of time in which a primary site storage system is permitted to replicate a copy of the primary system's data to a remote site storage system. In some embodiments, the copy of the primary system's data corresponds to a full backup of the primary system's data. In some embodiments, the copy of the primary system's data corresponds to an incremental backup of the primary system's data.

A management resource (e.g., an application, a virtual machine (VM), a container, a pod, etc.) remotely controls the configuration of a communication session between the primary site storage system and the remote site storage system and determines when to initiate the communication session. A malicious actor is unable to access the management resource to initiate the communication session because the management resource does not accept inbound connections. The communication session is not initiated by the primary site storage system. Rather, the management resource determines a start time and a duration for the communication session. The communication session corresponds to a period of time in which the primary site storage system is permitted to replicate a copy of the primary system's data to a remote site storage system.

The start time for each communication session is different. In some embodiments, the start time is selected by utilizing a pseudo-random start time algorithm. This reduces the likelihood that a malicious actor will intercept the replicated data as it is being transferred from the primary site storage system to the remote site storage system because the malicious actor will be less likely to know when to intercept or inject a virus into the data.

In some embodiments, the duration of the communication session is dynamic. For example, the duration may end when all of the copy of the primary system's data has been replicated, a load on the primary site storage system exceeds a load threshold, a load on the remote site storage system exceeds a load threshold, a network bandwidth between the primary site storage system and the remote site storage system decreases below a bandwidth threshold, etc. The length of the duration may change between communication sessions because the amount of data to be replicated is different. In some embodiments, the duration of the communication session is predetermined. For example, the duration may be two hours. In some embodiments, replication is not completed during a communication session having the predetermined duration. Any incomplete portion may be buffered by the primary site storage system until the next time a communication session is established between the primary site storage system and the remote site storage system.

The remote site storage system and the primary site storage system each include a corresponding first port that is associated with a corresponding non-routable internet protocol (IP) address and a corresponding second port that is associated with a corresponding routable IP address. The first ports associated with the primary site and the remote site storage systems may be accessed via the management resource. The second ports associated with the remote site and primary site storage systems have a default state of disabled. These ports are configured to only become enabled in response to receiving an instruction from a respective operating system. Advantageously, this unilateral path of enabling and disabling the second ports associated with the remote site and the primary site storage systems provides an extra layer of security.

The management resource stores one or more configuration files. The one or more configuration files may include information, such as a non-routable IP address of a remote site storage system port, a routable IP address of a remote site storage system port, a non-routable IP address of a primary site storage system port, etc. The management resource is configured to execute instructions (e.g., a script) to enable a communication session to be established for replicating data based on the one or more configuration files. The management resource is external to the primary site and may be located at the remote site. The management resource logs into the remote site storage system and provides to the first port of the remote site storage system an instruction to enable the second port of the remote site storage system. In response to receiving the instruction, the first port of the remote site storage system provides the instruction to an operating system of the remote site storage system. The operating system of the remote site storage system provides the instruction to the second port of the remote site storage system and causes (e.g., using scripts) the second port of the remote site storage system to become enabled.

Subsequently, the management resource establishes a secure connection with the primary site via the first port of the primary site storage system. The secure connection may be established based on a certificate-based authentication (e.g., mutual certificate-based authentication) between the management resource and the primary site storage system, a Zero Trust security framework, or other authenticated connection. A firewall is located at the primary site. The firewall includes one or more rules that indicate one or more IP addresses from which a connection is permitted. The IP address associated with the management resource is one of the one or more IP addresses. The firewall is configured to prevent data to be transmitted from the first port of the primary site storage system to the management resource. Communications between the management resource and the first port of the primary site storage system are unilaterally initiated by the management resource, that is, communications cannot be initiated from the first port of the primary site storage system to the management resource.

The management resource provides to the first port of the primary site storage system, via the established connection, an instruction to enable the second port of the primary site storage system. In response to receiving the instruction, the first port of the primary site storage system provides the instruction to an operating system of the primary site storage system. The operating system provides the instruction to the second port of the primary site storage system and causes (e.g., using scripts) the second port of the primary site storage system to become enabled.

The management resource registers the remote site storage system at the primary site storage system by providing the routable IP address associated with the second port of the remote site storage system. In response, the primary site storage system updates a data structure that indicates one or more storage systems to which the primary site storage system is connected or available to be connected. The management resource selects one or more backups to replicate from the primary site storage system to the remote site storage system. The one or more backups may be selected based on one or more factors, such as the communication session duration, a size of a backup, network throughput, a date of the backup, etc. In some embodiments, the management resource selects a most recent successful backup. In some embodiments, the management resource selects a most recent successful backup that passed a security vulnerability scan.

In response to a selection, the primary site storage system initiates a replication of the data associated with the selection to the remote site storage system. The data is replicated from the primary site storage system using the second port of the primary site storage system to the remote site storage system using the second port of the remote site storage system.

The management resource may poll the primary site storage system for a replication status via the first port of the primary site storage system during the communication session. In response to receiving a replication status of "complete" or the communication session duration being completed, the management resource is configured to re-establish network isolation between the primary site storage system and the remote site storage system.

The management resource re-establishes network isolation in part by unregistering the remote site storage system from a data structure associated with the primary site storage system that indicates one or more storage systems to which the primary site storage system is connected or available to be connected. The management resource sends to the first port of the primary site storage system an instruction to disable the second port of the primary site storage system. The first port of the primary site storage system provides the instruction to the operating system of the primary site storage system. In response to the instruction, the operating system of the primary site storage system causes (e.g., using scripts) the second port of the primary site storage system to become disabled.

The management resource sends to the first port of the remote site storage system an instruction to disable the second port of the remote site storage system. The first port of the remote site storage system provides the instruction to the operating system of the remote site storage system. In response to the instruction, the operating system of the remote site storage system causes (e.g., using scripts) the second port of the remote site storage system to become disabled. As a result of disabling the second port of the primary site and remote site storage systems, the connection between the primary site storage system and the remote site storage system is terminated.

The above steps may prevent a malicious actor from discovering that the primary site storage system was temporarily connected to the remote site storage system via a graphical user interface associated with either the primary system or the primary site storage system, or a configuration table associated with the primary site storage system. In the event a malicious actor obtains access to the primary site storage system, the malicious actor will be unaware of the remote site storage system. As a result, the likelihood that a malicious actor who gains access to the primary system will discover or access a copy is reduced.

FIG. 1 is a block diagram illustrating an embodiment of a system for providing a logical data isolation with intermittent connectivity. System 100 includes a primary site 101 and a remote site 121. Primary site 101 incudes primary system 102 and storage system 112. Remote site 121 includes management resource 122 and storage system 132. In some embodiments, primary site 101 and remote site 121 are located at different datacenters. In some embodiments, primary site 101 and remote site 121 are co-located in the same datacenter but associated with different networks.

Primary site 101 includes primary system 102 and storage system 112. Primary system 102 may be a server, a virtual machine, a database, and/or a computing device for which data is backed up. Remote site 121 includes management resource 122 and storage system 132. Management resource 122 may be an application, a virtual machine, a pod, a container, etc. Storage systems 112, 132 may be a server, a computing cluster that includes a plurality of storage nodes, a virtual machine running on a computing device, etc.

In some embodiments, the storage nodes of storage systems 112, 132 are homogenous nodes where each storage node has the same capabilities (e.g., processing, storage, memory, etc.). In some embodiments, at least one of the storage nodes of a storage system is a heterogeneous node with different capabilities (e.g., processing, storage, memory, etc.) than the other storage nodes of a storage system.

In some embodiments, a storage node of storage systems 112, 132 includes a processor, memory, and a plurality of storage devices. The plurality of storage devices may include one or more solid state drives, one or more hard disk drives, or a combination thereof. Backed up data may be stored in the one or more solid state drives, one or more hard disk drives, or a combination thereof.

In some embodiments, a storage node of storage systems 112, 132 includes a processor and memory, and is coupled to a separate storage device. The separate storage device may include one or more storage devices (e.g., flash storage devices). A storage device may be segmented into a plurality of partitions. Each of the storage nodes may be allocated one or more of the partitions. The one or more partitions allocated to a storage node may be configured to store data associated with some or all of the changed objects that were backed up to the secondary storage system. For example, the separate storage device may be segmented into 10 partitions and the secondary storage system may include 10 storage nodes. A storage node of the 10 storage nodes may be allocated one of the 10 partitions.

In some embodiments, a storage node of storage systems 112, 132 includes a processor, memory, and a storage device. The storage node may be coupled to a separate storage device. The separate storage device may include one or more storage devices. A storage device may be segmented into a plurality of partitions. Each of the storage nodes may be allocated one or more of the partitions. The one or more partitions allocated to a storage node may be configured to store data associated with some or all of the changed objects that were backed up to the storage system. For example, the separate storage device may be segmented into 10 partitions and the secondary storage system may include 10 storage nodes. A storage node of the 10 storage nodes may be allocated one of the 10 partitions.

Storage systems 112, 132 may be a cloud instantiation of a storage system. A configuration of the cloud instantiation of storage systems 112, 132 may be a virtual replica of a storage system. For example, a storage system may be comprised of three storage nodes, each storage node with a storage capacity of 10 TB. A cloud instantiation of the storage system may be comprised of three virtual nodes, each virtual node with a storage capacity of 10 TB. In other embodiments, a cloud instantiation of a storage system may have more storage capacity than an on-premises instantiation of a storage system. In other embodiments, a cloud instantiation of a storage system may have less storage capacity than an on-premises instantiation of a storage system. In some embodiments, storage system 112 is an on-premises storage system and storage system 132 is a cloud instantiation of a storage system.

A logical data isolation exists between storage system 112 and storage system 132 except for a particular point in time determined by management resource 122. Management resource 122 controls the configuration of a communication session between storage system 112 and storage system 132 and determines when to initiate the communication session. A malicious actor is unable to access management resource 122 to initiate the communication session because management resource 122 does not accept inbound connections. Management resource 122 determines a start time and a duration for the communication session. The communication session corresponds to a period of time in which storage system 112 is permitted to replicate a copy of the primary system's 102 data to storage system 132.

The start time for each communication session is different. In some embodiments, the start time is selected by utilizing a pseudo-random start time algorithm. The start time may be selected to occur within certain time constraints (e.g., between 12 am and 6 am) and satisfy certain service level agreements (e.g., no more than 24 hours between replications). This reduces the likelihood that a malicious actor will intercept the replicated data as it is transferred from storage system 112 to storage system 132 because the malicious actor will not know when to intercept or inject a virus into the replicated data.

In some embodiments, the duration of the communication session is dynamic. The duration ends when all of the copy of the primary system's 102 data has been replicated. The length of the duration may change between communication sessions because the amount of data to be replicated is different. In some embodiments, the duration of the communication session is predetermined. For example, the duration may be two hours. In some embodiments, replication is not completed during the communication session having the predetermined duration. Any incomplete portion may be buffered by storage system 112 until the next time a communication session is established between storage system 112 and storage system 132.

Storage system 112 and storage system 132 each include a corresponding first port 116, 136 that is associated with a corresponding non-routable IP address and a corresponding second port 118, 138 that is associated with a corresponding routable IP address. Ports 116, 136 may be accessed via a corresponding storage system internal network. Ports 118, 138 may be accessed via an external network. Ports 118, 138 have a default state of disabled. These ports are configured to only become enabled in response to receiving an instruction from corresponding port 116, 136 via corresponding connections 120, 140. In some embodiments, ports 116, 118 are physical ports. In some embodiments ports 116, 118 are software-defined ports (logical ports, transport ports). In some embodiments, ports 136, 138 are physical ports. In some embodiments ports 136, 138 are software-defined ports (logical ports, transport ports).

Management resource 122 stores one or more configuration files. The one or more configuration files may include information, such as a non-routable IP address of port 136, a routable IP address of port 138, a non-routable IP address of port 116, etc. Management resource 122 is configured to execute instructions to enable a communication session to be established for replicating data based on the one or more configuration files. Management resource 122 is located at remote site 121. In some embodiments, management resource 122 is located external to primary site 101 and remote site 121, such as in a cloud site. Management resource 122 logs into storage system 132 via connection 125 and provides to the first port 136 through firewall 134, an instruction to enable the second port 138. In response to receiving the instruction, the first port 136 provides the instruction to operating system 137 via connection 135. Operating system 137 provides the instruction to port 138 via connection 140, and causes (e.g., using scripts) the second port 138 to become enabled.

Subsequently, management resource 122 establishes a connection 150 with primary site 101 through firewalls 114, 124 via the first port 116. Connection 150 may be established based on a certificate-based authentication (e.g., mutual certificate-based authentication) between the management resource and the primary site storage system, a Zero Trust security framework, or other authenticated connection. Firewall 114 is located at primary site 101. Firewall 114 includes one or more rules that indicate one or more IP addresses from which a connection is permitted. The IP address associated with management resource 122 is one of the one or more IP addresses. Communications between management resource 122 and the first port 116 are unilaterally initiated by management resource 122, that is, communications cannot be initiated from the first port 116 to management resource 122. Firewall 124 is located at remote site 121. Firewall 124 includes one or more rules that indicate one or more IP addresses from which a connection is permitted.

Management resource 122 provides to the first port 116, via the established connection 150, an instruction to enable the second port 118. In response to receiving the instruction, the first port 116 provides the instruction to operating system 117 via connection 115. Operating system 117 provides the instruction to port 118 via connection 120 and causes (e.g., using scripts) the second port 118 to become enabled.

Management resource 122 registers remote site storage system 132 at primary site storage system 112 by providing the routable IP address associated with second port 138. In response, storage system 112 updates a data structure that indicates one or more storage systems to which the storage system 112 is connected or available to be connected. Management resource 122 selects one or more backups to replicate from storage system 112 to storage system 132. The one or more backups may be selected based on one or more factors, such as the communication session duration, a size of a backup, network throughput, a date of the backup, etc. In some embodiments, management resource 122 selects a most recent successful backup. In some embodiments, management resource 122 selects a most recent successful backup that passed a security vulnerability scan.

In response to a selection, storage system 112 initiates a replication of the data associated with the selection to storage system 132. The data is replicated from storage system 112 using the second port 118 to storage system 132 using the second port 138, via connection 160. Firewall rules associated with firewalls 114, 134 permit the replicated data to be provided from port 118 to port 138. In the event a backup did not pass a security vulnerability scan, storage system 112 may replicate the backup to a different remote site or a sandbox located at storage system 132.

Management resource 122 may poll storage system 112 for a replication status via the first port 116 during the communication session. In response to receiving a replication status of "complete" or the communication session duration being completed, management resource 122 is configured to re-establish the logical data isolation between storage system 112 and storage system 132.

Management resource 122 re-establishes the logical data isolation in part by unregistering storage system 132 from the data structure associated with storage system 112 that indicates one or more storage systems to which storage system 112 is connected or available to be connected. Management resource 122 sends to first port 116 a command to remove storage system 132 from the data structure. The first port 116 provides the command to operating system 117. In response, storage system 112 removes information associated with storage system 132 from the data structure. Management resource 122 sends to the first port 116 an instruction to disable the second port 118. In response to receiving the instruction, the first port 116 provides the instruction to operating system 117. In response, operating system 117 causes (e.g., using scripts) the second port 118 to become disabled via connection 120. Management resource 122 sends to the first port 136 of remote site storage system 132 an instruction to disable the second port 138 of the remote site storage system 132. In response to receiving the instruction, the first port 136 provides the instruction to operating system 137. In response, operating system 137 causes (using scripts) the second port 138 to become disabled via connection 140. As a result of disabling the second ports 118, 138, the logical data isolation between storage systems 112 and 132 is re-established because the connection 160 is terminated.

Figure 2:
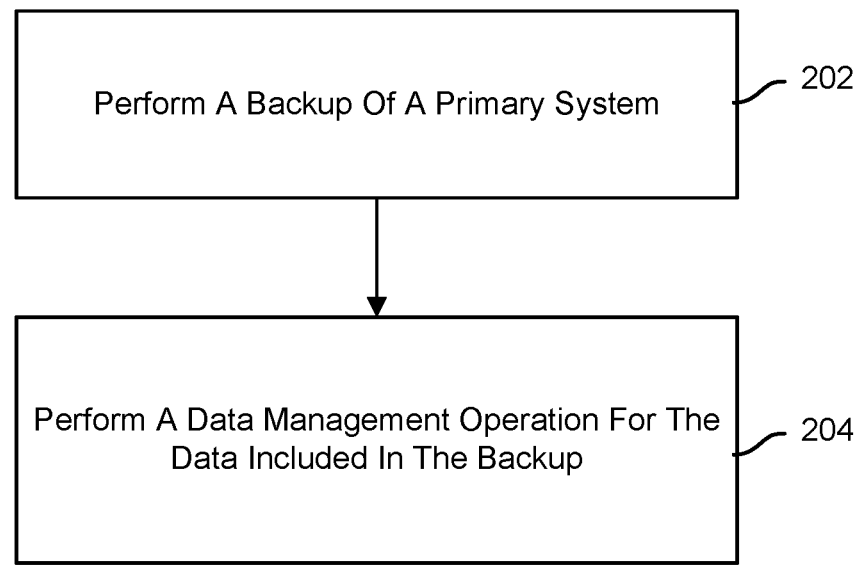
FIG. 2 is a flow diagram illustrating a process for replicating a backup to a remote site in accordance with some embodiments.

FIG. 2 is a flow diagram illustrating a process for replicating a backup to a remote site in accordance with some embodiments. In the example shown, process 200 may be performed by a storage system, such as primary site storage system 112.

At 202, a backup of a primary system is performed. The primary system may host one or more objects. Examples of objects include a file, a database, a VM, an application, a container, a pod, etc. A copy of the data associated with the one or more objects is backed up to a storage system. In some embodiments, the backup is a full backup of the one or more objects. In some embodiments, the backup is an incremental backup of the one or more objects.

At 204, a data management operation for the data included in the backup is performed. The data management operation may be restore, migration, replication, archive, etc. Data included in the backup is provided from a source system, such as a storage system, to a destination system.

Other systems may perform the data management operation after the backup is performed according to a schedule. The data associated with these data management operations may be compromised because the time at which they are performed is predictable. A malicious actor may obtain credentials for the primary system and/or the storage system.

As a result, the malicious actor may intercept the data associated with the management operation as it is being provided from the source system to the destination system.

A management resource associated with the destination system may cause the source system to perform the data management operation at an unpredictable start time and for an unpredictable duration. This reduces the likelihood that a malicious actor will intercept or inject a virus into the data associated with the data management operation as it is transferred from the source system to the destination system because the malicious actor will be less likely to know when the data is being transmitted.

Figure 3:
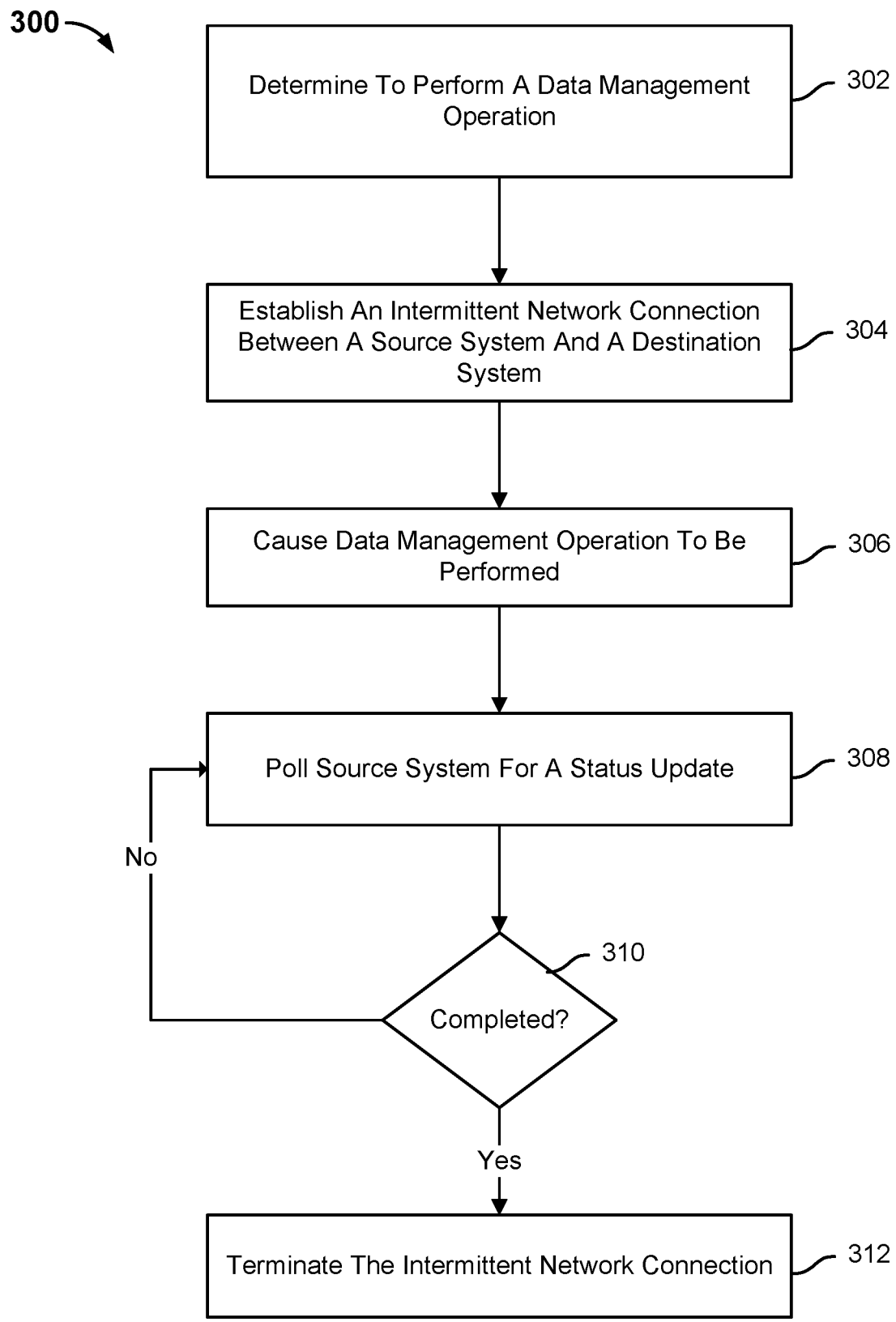
FIG. 3 is a flow diagram illustrating a process for performing a data management operation utilizing a logical data isolation with intermittent connectivity in accordance with some embodiments.

FIG. 3 is a flow diagram illustrating a process for performing a data management operation utilizing a logical data isolation with intermittent connectivity in accordance with some embodiments. In the example shown, process 300 may be performed by a management resource, such as management resource 122. In some embodiments, process 300 is implemented to perform some of step 204 of process 200.

At 302, a data management operation is determined to be performed. The data management operation may be restoration, migration, replication, archive, etc. A management resource utilizes a pseudo-random start time algorithm to determine when to start the data management operation.

At 304, an intermittent network connection is established between a source system and a destination system. The source system and the destination system are network isolated from each other except for a particular amount of time in which the source system is permitted to perform the data management operation and provide data associated with the data management operation to the destination system. The time at which the source system and destination system are permitted to communicate with each other changes each time a data management operation is performed. In some embodiments, the duration of the intermittent network connection is the same each time. In some embodiments, the duration of the intermittent network connection is different each time.

At 306, the data management operation is caused to be performed. A management resource associated with the destination system selects a protection job with which the data management operation is performed. In response to receiving the selection, the source system provides the data associated with the data management operation to the destination system.

At 308, the source system is polled for a status update. The management resource polls the source system for a status update associated with the data management operation. Communications between the management resource and the source system are unilateral. That is, the source system cannot be initiated from the source system to the management resource. However, the management resource may poll the source system for a status update associated with the data management operation. The polled status update may be "incomplete" or "complete."

At 310, it is determined whether a communication session associated with the data management operation has completed. The communication session associated with the data management operation is determined to be complete in the event the polled status update is "complete."

In the event it is determined that the communication session associated with the data management operation has completed, process 300 proceeds to 312. In the event it is determined that the communication session associated with the data management operation has not completed, process 300 returns to 308.

At 312, the intermittent network connection is terminated to re-establish the logical data isolation between the source system and the destination system. The source system and the destination system are network isolated from each other again.

Figure 4:
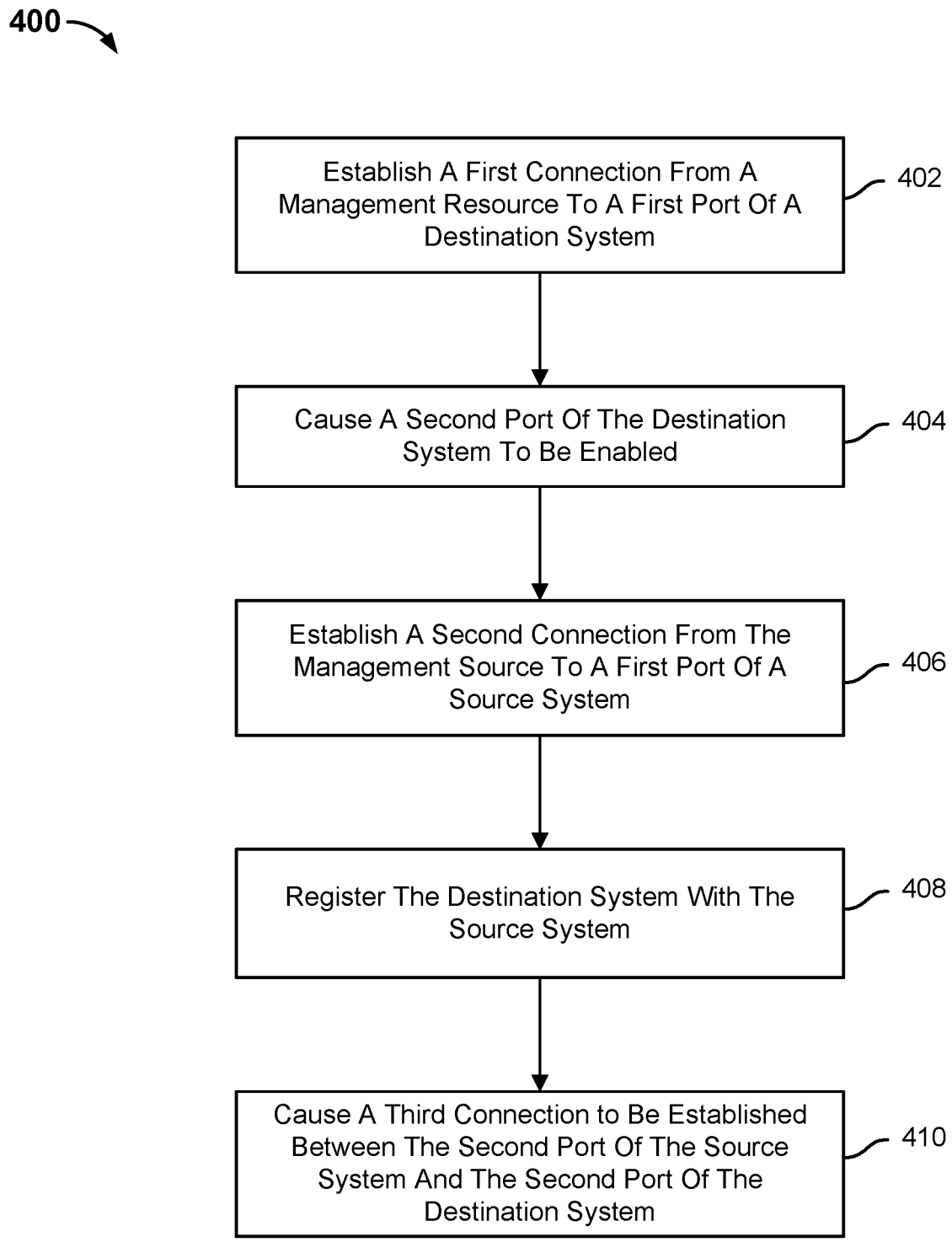
FIG. 4 is a flow diagram illustrating a process for establishing an intermittent network connection between a source system and a destination system in accordance with some embodiments.

FIG. 4 is a flow diagram illustrating a process for establishing an intermittent network connection between a source system and a destination system in accordance with some embodiments. In the example shown, process 400 may be implemented by a management resource, such as management resource 122. In some embodiments, process 400 is implemented to perform some or all of step 304 of process 300.

At 402, a first connection is established from a management resource to a first port of a destination system. The management resource stores one or more configuration files. The one or more configuration files may include information, such as a non-routable IP address of a first destination system port, a routable IP address of a second destination system port, a non-routable IP address of a first source system port, etc. The management resource is configured to log into the destination system to establish the first connection to the first port of the destination system.

At 404, a second port of the destination system is caused to be enabled. The management resource provides to the first port of the destination system an instruction to enable the second port of the destination system. The first port of the destination system provides the instruction to an operating system of the destination system. In response to receiving the instruction, the operating system of the destination system causes (e.g., using scripts) the second port of the destination system to become enabled.

At 406, a second connection is established from the management source to a first port of a source system. The second connection may be established based on a certificate-based authentication (e.g., mutual certificate-based authentication) between the management resource and the primary site storage system, a Zero Trust security framework, or other authenticated connection. A firewall is located at the primary site. The firewall includes one or more rules that indicate one or more IP addresses from which a connection is permitted. The IP address associated with the management resource is one of the one or more IP addresses. Communications between the management resource and the first port of the source system are unilaterally initiated by the management resource, that is, communications cannot be initiated from the first port of the source system to the management resource.

At 408, the destination system is registered with the source system. The management resource registers the destination system at the source system by providing the IP address associated with the second port of the destination system. In response, the source system updates a data structure that indicates one or more storage systems to which the source system is connected or available to be connected.

At 410, a third connection between a second port of the source system and the second port of the destination system is caused to be established. The management resource provides to the first port of the source system, via the second connection, an instruction to enable the second port of the source system. The first port of the source system provides the instruction to an operating system of the source system. In response to receiving the instruction, the operating system of the source system enables the second port of the source system.

Figure 5:
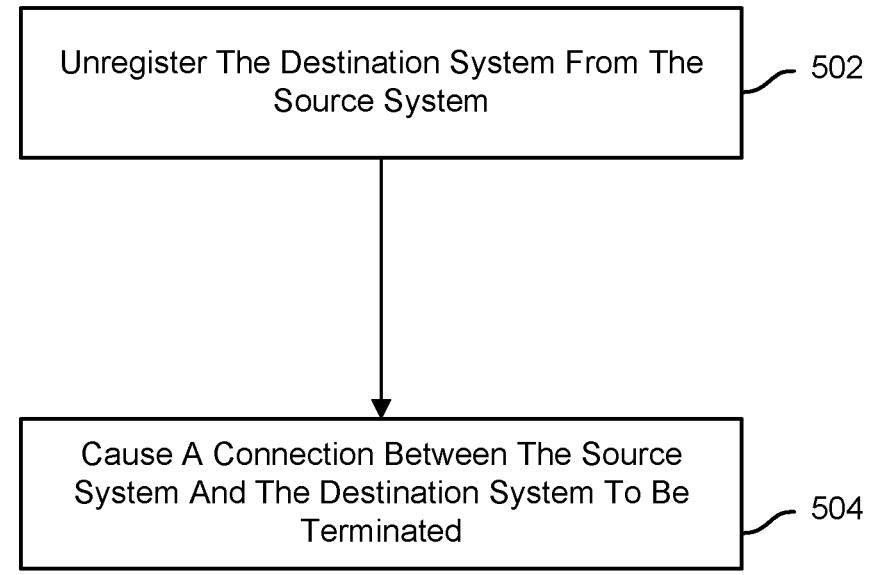
FIG. 5 is a flow diagram illustrating a process for terminating a network connection between a source system and a destination system in accordance with some embodiments.

FIG. 5 is a flow diagram illustrating a process for terminating a network connection between a source system and a destination system in accordance with some embodiments. In the example shown, process 500 may be implemented by a management resource, such as management resource 122. In some embodiments, process 500 is implemented to perform some or all of step 312 of process 300.

At 502, the destination system is unregistered from the source system. The management resource provides an instruction to remove the IP address associated with the second port of the destination system from the data structure that indicates one or more storage systems to which the source system is connected or available to be connected. In response, the source system removes the IP address associated with the second port of the destination system from the data structure.

At 504, a connection between the source system and the destination system is caused to be terminated. The management resource sends to the first port of the source system an instruction to disable the second port of the source system. The first port of the source system provides the instruction to an operating system of the source system. In response to the instruction, the operating system of the source system causes (using scripts) the second port of the source system to become disabled. The management resource sends to the first port of the destination system an instruction to disable the second port of the destination system. The first port of the destination system provides the instruction to an operating system of the destination system. In response to the instruction, the operating system of the destination system causes (using scripts) the second port of the destination system to become disabled. As a result of disabling the second port of the source and the destination systems, the connection between the primary site storage system and the remote site storage system is terminated.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    establishing an intermittent network connection between a source system and a destination system including by:
        establishing a first connection from a management resource to a first port of the destination system;
        causing a second port of the destination system to be enabled including by providing an instruction via the first connection to the first port of the destination system;
        establishing a second connection from the management resource to a first port of the source system, wherein the first port of the destination system and the first port of the source system are associated with corresponding non-routable internet protocol addresses;
        causing a second port of the source system to be enabled including by providing an instruction via the second connection to the first port of the source system, wherein the second port of the destination system and the second port of the source system are associated with corresponding routable internet protocol addresses;
        registering the destination system with the source system; and
        causing a third connection to be established between the second port of the source system and the second port of the destination system for transferring data from the source system to the destination system; and
    in response to a determination that a communication session of the third connection has been completed, terminating the intermittent network connection between the source system and the destination system.

2. The method of claim 1, wherein the management resource is a virtual machine.

3. The method of claim 1, wherein the management resource is located at a remote site that includes the destination system.

4. The method of claim 1, further comprising determining whether to perform a data management operation.

5. The method of claim 4, wherein the intermittent network connection is established in response to determining to perform the data management operation.

6. The method of claim 4, wherein the data management operation includes a replication of data from the source system to the destination system.

7. The method of claim 1, wherein the intermittent network connection is established at a selected point in time.

8. The method of claim 1, wherein the intermittent network connection is established for a predetermined duration.

9. The method of claim 1, wherein the intermittent network connection is established for a dynamically determined duration.

10. The method of claim 1, wherein the data is transferred during the communication session from the source system to the destination system.

11. The method of claim 1, further comprising polling the source system for a status update.

12. The method of claim 11, further comprising determining whether the communication session of the third connection has been completed based on the status update.

13. The method of claim 1, wherein the data to be transferred from the source system to the destination system is associated with a selected protection job.

14. The method of claim 1, wherein terminating the intermittent network connection between the source system and the destination system includes unregistering the destination system at the source system.

15. The method of claim 1, wherein terminating the intermittent network connection between the source system and the destination system includes causing the third connection to be terminated.

16. The method of claim 1, wherein terminating the intermittent network connection between the source system and the destination system includes causing the second port of the destination system and the second port of the source system to be disabled.

17. A computer program product embodied in a non-transitory computer readable medium and comprising computer instructions for:
- establishing an intermittent network connection between a source system and a destination system including by:
  - establishing a first connection from a management resource to a first port of the destination system;
  - causing a second port of the destination system to be enabled including by providing an instruction via the first connection to the first port of the destination system;
  - establishing a second connection from the management resource to a first port of the source system, wherein the first port of the destination system and the first port of the source system are associated with corresponding non-routable internet protocol addresses;
  - causing a second port of the source system to be enabled including by providing an instruction via the second connection to the first port of the source system, wherein the second port of the destination system and the second port of the source system are associated with corresponding routable internet protocol addresses;
  - registering the destination system with the source system; and
  - causing a third connection to be established between the second port of the source system and the second port of the destination system for transferring data from the source system to the destination system; and
- in response to a determination that a communication session of the third connection has been completed, terminating the intermittent network connection between the source system and the destination system.

18. A system, comprising:
one or more processors configured to:
- establish an intermittent network connection between a source system and a destination system, wherein to establish the intermittent network connection, the processor is configured to:
  - establish a first connection from a management resource to a first port of the destination system;
  - cause a second port of the destination system to be enabled including by providing an instruction via the first connection to the first port of the destination system;
  - establish a second connection from the management resource to a first port of the source system, wherein the first port of the destination system and the first port of the source system are associated with corresponding non-routable internet protocol addresses;
  - cause a second port of the source system to be enabled including by providing an instruction via the second connection to the first port of the source system, wherein the second port of the destination system and the second port of the source system are associated with corresponding routable internet protocol addresses;
  - register the destination system with the source system; and
  - cause a third connection to be established between the second port of the source system and the second port of the destination system for transferring data from the source system to the destination system; and
- in response to a determination that a communication session of the third connection has been completed, terminate the intermittent network connection between the source system and the destination system; and
a memory coupled to the one or more processors and configured to provide the one or more processors with instructions.

19. The computer program product of claim 17, wherein the management resource is a virtual machine.

20. The computer program product of claim 17, wherein the management resource is located at a remote site that includes the destination system.

* * * * *